United States Patent Office 3,456,833
Patented July 22, 1969

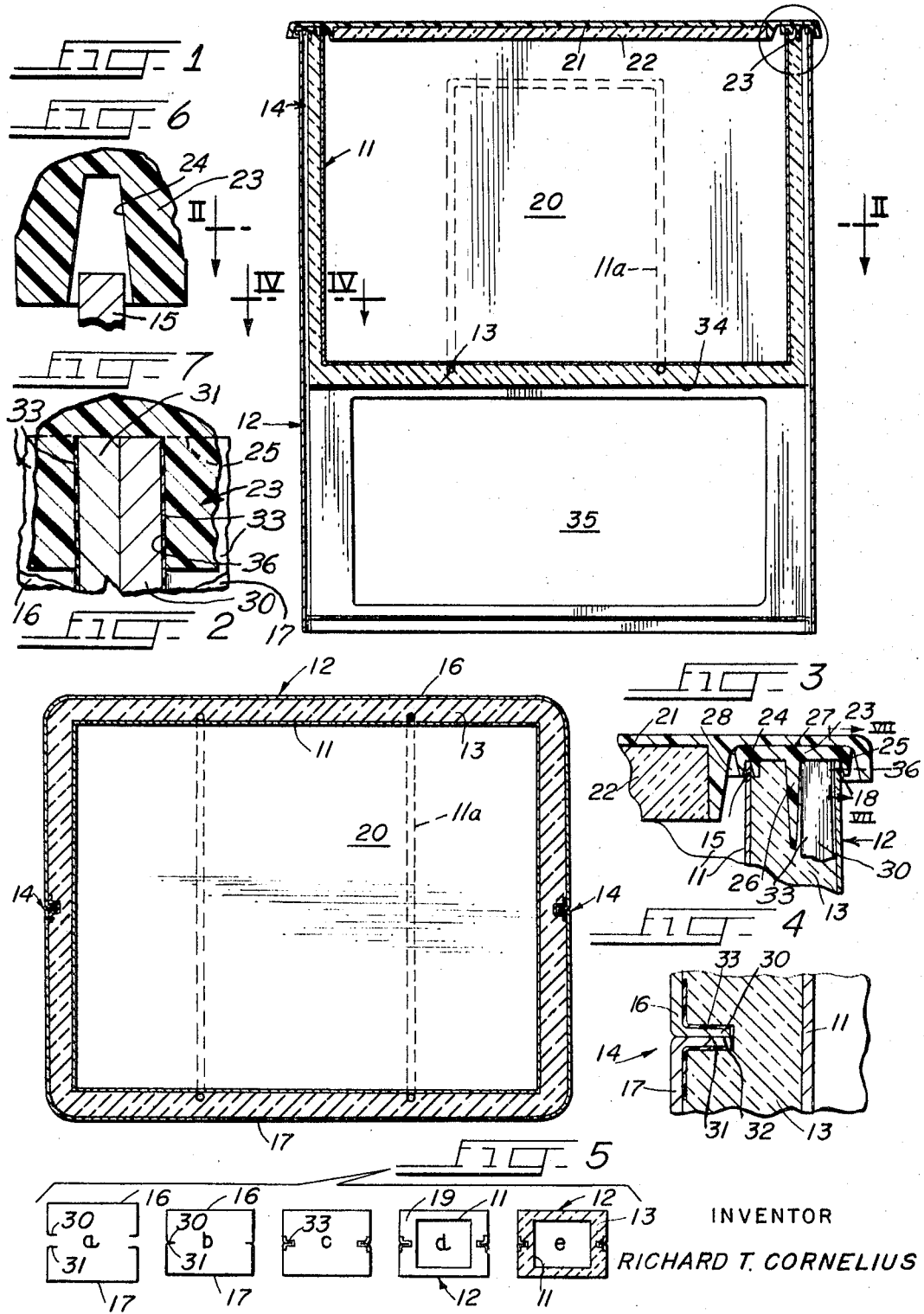

3,456,833
CABINET CONSTRUCTION
Richard T. Cornelius, Minneapolis, Minn., assignor to The Cornelius Company, Anoka, Minn., a corporation of Minnesota
Filed Sept. 2, 1965, Ser. No. 484,617
Int. Cl. B65d 25/18
U.S. Cl. 220—9                                16 Claims

ABSTRACT OF THE DISCLOSURE

A refrigerator cabinet has a liner with a prefinished interior and a surrounding shell with a prefinished exterior joined together by in-situ-foamed urethane insulation, a generally annular breaker strip receiving edges of said liner and said shell to prevent foam leakage during the foaming, the shell comprising sections with abutting flanges which are sealed by pressure-sensitive tape to prevent foam leakage and to serve as a vapor barrier and as holding means reinforced by such foam. A prefinished liner and a prefinished shell are joined together by in-situ-foaming wherein abutting shell elements are sealingly held together by application of pressure-sensitive tape, followed by foaming of urethan insulation against such tape.

---

This invention relates generally to a construction of a refrigeratable cabinet, and more specifically to a structure in which urethane insulation is foamed in situ, and serves as a means by which the components of the cabinet are held together.

Although the principles of the present invention may be included in various cabinets, a particularly useful application is made in a cabinet which is refrigerated or which is adapted to be refrigerated. Such cabinets comprise an article of commerce in and of themselves, and such cabinets also may be incorporated as a part of other refrigerated devices such as dispensing or vending machines, coolers, refrigerators, display cabinets, and the like.

In industries engaged in the manufacture of such refrigerated cabinetry, there is a good deal of economic competition, and therefore it is desirable at all times to provide in production the economy of construction which is possible, either as to labor, materials, required tooling, or a combination thereof. Any economy which may be obtained should not be obtained at the expense of quality of product.

To this end, the present invention utilizes urethane insulation foamed in situ, the same comprising not only insulation material per se, but also comprising a structural member coactive with other structural members to hold them assembled as a unitary device. By a special preferred feature of this invention, plastic tape may be employed as temporary holding means, as a means by which leakage of liquid insulation is precluded, as part of permanent holding means, and as a vapor barrier.

Accordingly, it is an object of the present invention to provide an improved cabinet.

A further object of the present invention is to provide a refrigeratable cabinet wherein the thermal insulation comprises an integrated structural element mechanically coactive with other elements to hold them assembled.

Yet another object of the present invention is to utilize pressure-sensitive tape in a joint, such tape having a temporary purpose in the fabrication of the cabinet, and such tape having a permanent purpose in the resulting device or joint.

A still further object of the present invention is to provide a method for fabricating a joint between a pair of sheet-like cabinet elements.

Many other advantages, features and additional objects of the present invention will become manifest to those versed in the art upon making reference to the detailed description and to the accompanying sheet of drawings in which a preferred structural embodiment incorporating the principles of the present invention is shown by way of illustrative example.

On the drawings:

FIG. 1 is a vertical cross-sectional view of a refrigeratable cabinet constructed in accordance with the principles of the present invention;

FIG. 2 is a horizontal cross-sectional view taken along line II—II of FIG. 1;

FIG. 3 is a fragmentary enlarged cross-sectional view of the encircled portion of FIG. 1;

FIG. 4 is an enlarged fragmentary cross-sectional view taken along line IV—IV of FIG. 1;

FIG. 5 is a series of diagrams illustrating the method steps by which the structure of FIGS. 1–4 is assembled;

FIG. 6 is an enlarged view of a portion of FIG. 3; and

FIG. 7 is an enlarged cross-sectional view taken along line VII—VII of FIG. 3.

As shown on the drawings:

The principles of this invention are particularly useful when embodied in a refrigeratable cabinet assembly such as illustrated in FIG. 1, generally indicated by the numeral 10. The cabinet assembly or cabinet 10 includes a liner 11, a shell 12, a quantity of foamed urethane insulation 13, the elements 11–13 being joined together rigidly and including a cabinet joint generally indicated at 14.

The liner 11 comprises a rectangular tank which is open at the top. Refrigeration coils 11a may be provided in intimate contact against the outer surface thereof, or refrigeration means may be disposed within the liner 11. The upper peripheral portion or edge 15 of the liner 11 thus defines an upwardly directed opening, and hence the liner is referred to herein as being generally annular.

The shell 12, as best seen in FIG. 2, comprises a pair of shell sections 16, 17 jointly encircling or extending about the liner 11 in spaced relation thereto throughout their mutual extents. The shell 12 has an upper portion or peripheral edge 18 which also is therefore referred to herein as being generally annular. Before the insulation 13 is applied, there is therefore a space 19 (FIG. 5) between the liner 11 and the shell 12, which space 19 throughout substantially the entire vertical extent of the liner 11, is bridged only by the insulation 13. The liner 11 and the shell 12 comprise prefinished material, e.g. vinyl coated, so that no subsequent treatment is applied to the inside of the liner 11 or the outside of the shell 12.

The liner 11 defines a chamber 20 which is closed at its upper end by a manually removable plastic cover 21 which has a quantity of styrofoam insulation 22 secured to its inner surface. The cover 21 rests upon a plastic breaker strip 23, the details of which are best seen in FIG. 3.

The breaker strip 23 preferably is made of semi-rigid vinyl and is generally annular in that it overlies the upper edge of both the liner 11 and the shell 12 throughout their perimeters. The breaker strip 23 has an inner downwardly opening channel or groove 24 which receives the peripheral edge 15 of the liner 11 throughout its perimetral extent. As shown in FIG. 6, the groove 24 is tapered in cross-section, having a wider entrant end to facilitate assembly, and an inner end slightly narrower than the thickness of the material of which the liner is made to assure a tight interference fit. No sealing compound is employed, and an 0.18 inch liner wall thickness is adequate. The breaker strip 23 also has a similarly tapered downwardly opening channel or groove 25 which encircles the groove or channel 24, and which receives the peripheral edge 18 of the shell 12. The strip 23 further has a downwardly centrally disposed flange 26 having a finger-like cross-section which extends into the insulation 13. The upper surface 27 of the breaker strip 23 conforms to the lower surface of the cover 21, and in this embodiment is substantially flat, the surface 27 merging into a central opening 28 which defines the opening or access to the chamber 20.

The shell 12, here comprising the pair of shell sections 16, 17, includes at least one of the cabinet joints 14, the illustrated embodiment including two such joints. One of the joints 14 is illustrated in greater detail in FIG. 4. Each of the sheet-like portions or sections 16, 17 of the shell 12 includes edge portions in abutting relation to each other. To this end, there is provided a pair of inwardly directed flanges 30, 31 respectively integral with the shell sections 16, 17 and both extending transversely to the adjacent surface thereof. The flanges 30, 31 jointly define a plane of engagement 32, such plane of engagement 32 being spanned by, and the flanges 30, 31 thus being surrounded by adhesive sealing means, here illustrated as being pressure-sensitive tape 33 which extends vertically in this embodiment coextensively with the height of the liner 11 plus the thickness of the insulation 13 at the bottom of the liner. Other forms of adhesive sealing means include putty, tar, and "Permagum." Since the upper portion or edge 18 of the shell 12 is received in the channel or groove 25 of the breaker strip, the material of the breaker strip 23 which defines the inner wall of the groove 25 is notched as at 36 (FIGS. 3 and 7) to enable reception of the tape-covered flanges 30, 31.

The illustrated cabinet 10 is constructed or assembled in the manner schematically indicated in FIG. 5a, b, c d and e. As shown at FIG. 5a, the sheet-like cabinet elements or shell sections 16, 17 are first provided with the flanges 30, 31 so directed as to be abuttable flatwise against each other. Thereafter, as shown in FIG. 5b, the sheet-like elements or shell sections 16, 17 are brought together in a foaming fixture so that the flanges 30, 31 abut each other in a flatwise manner to define the plane of engagement 32 shown in FIG. 4. Thereafter, the strip of plastic pressure-sensitive tape 33 or other sealing means is applied so as to extend about the flanges 30, 31, spanning the plane of engagement 32, and preferably extending onto portions of the shell sections 16, 17 which are parallel to the adjacent portion of the liner 11. At this point, the shell 12 is ready to receive the urethane which is to be foamed in situ, and to keep the same in position, suitable means are provided, referred to herein as liquid retaining means, FIG. 5d illustrating the same as being the liner 11 in this embodiment and also including the breaker strip 23. Thereafter, as shown in FIG. 5e, and with the cabinet inverted, urethane is foamed in the space 19 and thus completely fills the space between the liner 11 and the shell 12. The finished foamed urethane insulation, when the same is completely foamed, has a rigid configuration conforming to that shown in FIGS. 1 and 2. To the lower surface of the urethane insulation there is applied a sealing barrier 34, such as a ⅛" layer of tar, or a sheet of aluminum foil, which forms a ceiling of a sub-chamber 35, in which refrigeration equipment may be installed. If the foaming is carried out with the cabinet in a non-inverted position, a temporary form, ceiling, or platen may be provided so as to abut the interiorally directed walls of the shell 12, and to define the surface of the insulation 13 against which the sealing barrier 34 is disposed. The breaker strip 23 serves not only the ultimate purpose of being a finishing means, but also serves the temporary purpose of preventing foam leakage during the in-situ-foaming operation. The breaker strip 23 comprises material, here shown to be a vinyl plastic, which is a poor thermal conductor, so that the same does not constitute a thermal bridge between the peripheral edges 15 and 18. The sole connection other than the breaker strip 23 between the liner 11 and the shell 12 is the insulation 13, whereby there is an absence of thermal bridges throughout the entire structure between the liner 11 and the shell 12.

The foamed urethane, during the in situ foaming, forms a mechanical bond with the inner surface of the shell 12, with the outer surface of the liner 11, and with the interior surface of the breaker strip 23. The insulation being rigid, also has a configuration which prevents relative movements between the liner 11, the shell 12, the insulation 13, and the breaker strip 23, so that the same comprise a unitized rigid structure in which the liner 11 is entirely supported by the insulation 13, and wherein such components are held in assembled relation without use of any rivets, welds, screws, or the like.

In constructing the joint 14, the sealing means or tape 33 thus serves as a temporary holding means as illustrated in FIG. 5c, and further serves as a means by which liquid or foaming insulation is retained within the generally annular space 19. The foamed insulation 13 coacts with and through the tape 33 to act on the flanges 30, 31 to hold the same in abutting relation, the insulation 13 likewise permanently holding the tape 33 against such flanges. Thus, the insulation 13 which extends about the flanges 30, 31, and about the tape 33, as well as the tape 33 coacting with the insulation 13, comprise the sole connection between the flanges 30, 31 throughout the length of the joint from the breaker strip 23 to a point beneath the liner 11.

The tape 33 is pressure sensitive and is resistant to the heat developed in the foaming of the urethane. Since the tape 33 forms a part of the permanent structure of the joint 14, the tape 33 perferably also comprises not only a material which will prevent leakage of liquid foam, but which will serve as a permanent vapor barrier. To this end, plastic tape is preferred, typical usable tape bases being polyester, vinyl, or Dupont's "Mylar." Thus, the tape 33 comprises a permanent vapor barrier which is held by the urethane foam 13, such foam also holding the shell sections 16, 17 together. The wall thickness of the foamed urethane typically is ¾ inch, and the horizontal extent of the flanges 30, 31 typically extends less than halfway through the wall thickness of the foamed urethane. The thickness of the tape is FIGS. 2, 4 and 5 has been somewhat exaggerated for clarity of illustration. The notch 36 in the breaker strip 23 not only provides necessary clearance for the flanges 30, 31, but also provides a clamping action acting to hold the upper ends of the flanges 30, 31 together. The elongated finger 26 not only stiffens the surface 27, but also provides a great increase in surface on which the insulation 13 may act for holding purposes.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A cabinet comprising:
   (a) a liner defining a storage chamber, and having a first generally annular peripheral edge;
   (b) a shell surrounding said liner in spaced relation thereto, and having a second generally annular peripheral edge adjacent to and spaced from said first peripheral edge;
   (c) a generally annular breaker strip of thermally nonconductive material having spaced grooves in which said peripheral edges are disposed, and which strip thereby defines an opening leading to said chamber; and
   (d) foamed insulation disposed in the generally annular space between said liner and said shell, and having an in-situ-foaming bond directly with said liner, said shell, and said breaker strip by which bond said liner, said shell, said breaker strip, and said insulation jointly form a rigid structure.

2. A cabinet comprising:
(a) a liner defining a storage chamber;
(b) a pair of shell sections jointly surrounding said liner in spaced relation thereto, each of said sections having at least one inwardly directed flange flatwise abutting the flange of the other of said shell sections and defining a plane of engagement;
(c) pressure-sensitive plastic tape secured about said flanges in spanning relation to said plane of engagement; and
(d) foamed insulation disposed in the generally annular space between said liner and said shell sections, said insulation comprising in-situ-foamed means holding said liner, said shell and said tape in a fixed relation to each other; and
(e) said tape comprising temporary means both for holding said flanges in said abutting engagement and for preventing foam leakage at said plane of engagement during the in-situ-foaming of said insulation, and comprising both a permanent vapor barrier along said plane of engagement and a permanent means aided by said foamed insulation for somewhat more strongly maintaining said abutting engagement of said flanges.

3. A method of making a joint between a pair of sheet-like cabinet elements, comprising:
(a) disposing the pair of sheet-like cabinet elements in abutting relation to each other in a manner to define a plane of engagement;
(b) applying pressure-sensitive tape to the elements in spanning relation to said plane of engagement; and
(c) foaming a quantity of urethane insulation, while holding it against said tape, said quantity being such as to completely overlie said elements and said tape throughout the length of the desired joint.

4. A method of making a joint between a pair of sheet-like cabinet elements, comprising:
(a) forming a flange at an edge of each of said elements;
(b) disposing the pair of sheet-like elements so that the flanges are in face-to-face abutting engagement with each other, thereby defining a plane of engagement;
(c) applying a strip of pressure-sensitive tape to the flanges so as to extend thereabout in spanning relation to said plane of engagement;
(d) disposing a means spaced from the tape to retain liquid thereabout; and
(e) foaming a quantity of urethane insulation in such space about said tape, said quantity being such as to extend about said flange and tape throughout the extent of the desired joint.

5. A method as claimed in claim 4 in which the tape applied is a liquid-tight vapor-tight plastic.

6. A cabinet comprising:
(a) a liner defining a storage chamber, and having a first generally annular peripheral edge;
(b) a shell surrounding said liner in spaced relation thereto, and having a second generally annular peripheral edge adjacent to and spaced from said first peripheral edge;
(c) a generally annular breaker strip of thermally nonconductive material having a pair of radially spaced grooves in which said peripheral edges are disposed, each of said grooves at their narrowest width being respectively narrower than the thickness of said edges; and
(d) foamed insulation disposed in the generally annular space between said liner and said shell, and having an in-situ-foaming bond with said liner, said shell, and said breaker strip.

7. A cabinet comprising:
(a) a liner defining a storage chamber, and having a first generally annular peripheral edge;
(b) a shell surrounding said liner in spaced relation thereto, and having a second generally annular peripheral edge adjacent to and spaced from said first peripheral edge, said shell having at least one pair of inwardly directed flanges in flatwise abutting engagement with each other;
(c) a generally annular breaker strip of thermally nonconductive material having a pair of radially spaced grooves in which said peripheral edges are disposed, said strip having means defining a notch at the inner side of the outer of said grooves in which notch said flanges are disposed, said notch means holding said flanges together; and
(d) foamed insulation disposed in the generally annular space between said liner and said shell, and havng an in-situ-foamed bond with said liner, said shell, and said breaker strip.

8. A cabinet comprising:
(a) a liner defining a storage chamber, and having a first generally annular peripheral edge;
(b) a shell surrounding said liner in spaced relation thereto, and having a second generally annular peripheral edge adjacent to and spaced from said first peripheral edge;
(c) a generally annular breaker strip of thermally nonconductive material in which said peripheral edges are disposed, and which strip thereby defines an opening leading to said chamber, said strip having a centrally disposed flange extending between said liner and said shell in spaced relation thereto; and
(d) foamed insulation disposed in the generally annular space between said liner and said shell, having an in-situ-foaming bond with said breaker strip flange by which said breaker strip is retained, and having an in-situ-foamed bond with said liner and said shell by which bond said liner is supported, said insulation and breaker strip comprising the sole connection between said liner and said shell by which any ambient heat may be conducted from said shell to said liner.

9. A cabinet comprising:
(a) a liner defining a storage chamber, and having a first generally annular peripheral edge;
(b) a shell surrounding said liner in spaced relation thereto, and having a second generally annular peripheral edge adjacent to and spaced from said first peripheral edge;
(c) a generally annular breaker strip of thermally nonconductive material having spaced grooves in which said peripheral edges are disposed, and which strip thereby defines an opening leading to said chamber;
(d) foamed insulation disposed in the generally annular space between said liner and said shell, and having an in-situ-foaming bond directly with said liner and said shell by which bond said liner is supported; and
(e) the width of said grooves in said breaker strip and the thickness of the material of said liner and of said shell comprisng means to prevent foam leakage at said peripheries during the in-situ-foaming of said insulation.

10. A cabinet comprising:
(a) a liner defining a storage chamber;
(b) a shell surrounding said liner in spaced relation thereto, said shell having at least one pair of edge portions extending perpendicularly inwardly from a wall of said shell in abutting face-to-face relation with each other and defining a plane of engagement;
(c) a pressure-sensitive tape disposed in the space between said liner and said shell and secured to said shell in transverse spanning relation to said plane of engagement; and
(d) foamed insulation disposed in the generally annular space between said liner and said shell, said insulation comprising in-situ-foamed means holding said liner, said shell and said tape in a fixed relation to each other and urging said tape against said shell.

11. A cabinet comprising:
(a) a liner defining a storage chamber;

(b) a shell surrounding said liner in spaced relation thereto, said shell having at least one pair of edge portions extending perpendicularly inwardly from a wall of said shell in abutting face-to-face relation with each other and defining a plane of engagement;
(c) pressure sensitive tape disposed in the space between said liner and said shell and secured to said shell in transverse spanning relation to said plane of engagement;
(d) foamed insulation disposed in the generally annular space between said liner and said shell, said insulation comprising in-situ-foamed means holding said liner, said shell and said tape in a fixed relation to each other, and urging said tape against said shell and
(e) said tape further comprising means to prevent foam leakage at said plane of engagement during the in-situ-foaming of said insulation.

12. A cabinet comprising:
(a) a liner defining a storage chamber;
(b) a shell surrounding said liner in spaced relation thereto, said shell having at least one pair of edge portions extending perpendicularly inwardly from a wall of said shell in abutting face-to-face relation with each other and defining a plane of engagement;
(c) pressure-sensitive tape disposed in the space between said liner and said shell and secured to said shell in transveres spanning relation to said plane of engagement;
(d) foamed insulation disposed in the generally annular space between said liner and said shell, said insulation comprising in-situ-foamed means holding said liner, said shell and said tape in a fixed relation to each other, and urging said tape against said shell; and
(e) said tape further comprising a permanent vapor barrier along said plane of engagement.

13. A cabinet comprising:
(a) a liner defining a storage chamber;
(b) a shell surrounding liner in spaced relation thereto, said shell having at least one pair of edge portions extending perpendicularly inwardly from a wall of said shell in abutting face-to-face relation with each other and defining a plane of engagement;
(c) pressure-sensitive tape disposed in the space between said liner and said shell and secured to said shell in transverse spanning relation to said plane of engagement;
(d) foamed insulation disposed in the generally annular space between said liner and said shell, said insulation comprising in-situ-foamed means holding said liner, said shell and said tape in a fixed relation to each other and urging said tape against said shell; and
(e) said tape comprising both temporary means for holding said edge portions in said abutting relation during the in-situ-foaming of said insulation, and comprising permanent means aided by said foamed insulation for maintaining said abutting relation of said edge portions.

14. A cabinet comprising:
(a) a liner defining a storage chamber;
(b) a shell surrounding said liner in spaced relation thereto, said shell having at least one pair of flanges extending perpendicuarly inwardly from a wall of said shell in face-to-face abutting engagement with each other and defining a plane of engagement extending along one side of said liner;
(c) pressure-sensitive tape disposed in the space between said liner and said shell and secured to said shell in transverse spanning relation to said plane of engagement;
(d) foamed insulation disposed in the generally annular space between said liner and said shell, said insulation comprising in-situ-foamed holding said liner, said shell and said tape in a fixed relation to each other; and
(e) said insulation and tape comprising the sole means effecting the connection between said flanges along substantially the entire extent thereof lying adjacent to said liner.

15. A cabinet comprising:
(a) a liner defining a storage chamber;
(b) a shell surrounding said liner in spaced relation thereto, said shell having at least one pair of edge portions extending perpendicularly inwardly from a wall of said shell in abutting face-to-face relation with each other and defining a plane of engagement;
(c) a strip of adhesive sealing means disposed in the space between said liner and said shell and secured to said shell in transverse spanning relation to said plane of engagement; and
(d) foamed insulation disposed in the generally annular space between said liner and said shell, said insulation comprising in-situ-foamed means holding said liner, said shell and said strip of adhesive sealing means in a fixed relation to each other, and urging said sealing means against said shell.

16. A cabinet comprising:
(a) a liner defining a storage chamber, and having an open top with a first generally annular peripheral edge;
(b) a generally tubular shell surrounding said liner in spaced relation thereto, and having a second generally annular peripheral edge adjacent to and spaced radially outwardly from said first peripheral edge;
(c) a generally annular breaker strip of thermally nonconductive material having downwardly facing spaced grooves in which said peripheral edges are disposed, and which strip thereby defines an opening leading to said chamber;
(d) foamed insulation disposed in the generally annular space between said liner and said shell, and having an in-situ-foamed bond with said shell and with all external surfaces of said liner; and
(e) a sealing barrier extending transversely to the axis of said generally tubular shell, enclosing a similarly directed portion of said insulation, and forming the ceiling of a subchamber within said shell.

References Cited

UNITED STATES PATENTS

| | | | |
|---|---|---|---|
| 2,106,840 | 2/1938 | Gould | 220—9 |
| 2,133,951 | 10/1938 | Ashbaugh | 312—214 X |
| 2,644,605 | 7/1953 | Palmer | 220—15 |
| 2,795,264 | 6/1957 | Pechy. | |
| 2,815,649 | 12/1957 | DiAngelus et al. | 312—214 |
| 2,896,271 | 7/1959 | Kloote et al. | |
| 2,962,183 | 11/1960 | Rill et al. | 220—9 |
| 2,978,136 | 4/1961 | Ehrenfreund | 220—9 |
| 3,007,224 | 11/1961 | Wean | 220—15 X |
| 3,078,003 | 2/1963 | Kesling | 220—9 |
| 3,165,221 | 1/1965 | Kasady | 220—9 |
| 3,313,438 | 4/1967 | Piker | 215—13 |

JOSEPH R. LECLAIR, Primary Examiner

JAMES R. GARRETT, Assistant Examiner